US008924971B2

(12) United States Patent
Ahrens et al.

(10) Patent No.: US 8,924,971 B2
(45) Date of Patent: *Dec. 30, 2014

(54) SELECTABLE EVENT REPORTING FOR HIGHLY VIRTUALIZED PARTITIONED SYSTEMS

(75) Inventors: George H. Ahrens, Pflugerville, TX (US); Alan D. Seid, Pleasant Valley, NY (US); Calvin D. Ward, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 95 days.

This patent is subject to a terminal disclaimer.

(21) Appl. No.: 13/604,255

(22) Filed: Sep. 5, 2012

(65) Prior Publication Data

US 2013/0152082 A1    Jun. 13, 2013

Related U.S. Application Data

(63) Continuation of application No. 13/324,654, filed on Dec. 13, 2011.

(51) Int. Cl.
G06F 9/46 (2006.01)
G06F 11/00 (2006.01)
G06F 3/00 (2006.01)

(52) U.S. Cl.
USPC .................................. 718/1; 719/318; 714/2

(58) Field of Classification Search
None
See application file for complete search history.

(56) References Cited

U.S. PATENT DOCUMENTS

| 5,263,032 | A  | 11/1993 | Porter et al. |
| 6,779,027 | B1 | 8/2004  | Schunicht et al. |
| 6,912,670 | B2 | 6/2005  | Wilkie |
| 6,965,896 | B1 | 11/2005 | Shedden |
| 7,080,230 | B2 | 7/2006  | Bennett et al. |
| 7,290,125 | B2 | 10/2007 | Armstrong et al. |
| 7,657,776 | B2 | 2/2010  | Rajkumari et al. |
| 2002/0012413 | A1 | 1/2002 | Den Besten |
| 2002/0124215 | A1 | 9/2002 | Austen et al. |
| 2003/0056155 | A1 | 3/2003 | Austen et al. |
| 2006/0271930 | A1 | 11/2006 | Letizi et al. |
| 2008/0077826 | A1 | 3/2008 | Kondajeri et al. |
| 2009/0119665 | A1 | 5/2009 | Venkitachalam et al. |
| 2009/0217104 | A1 | 8/2009 | Wilding et al. |
| 2009/0241111 | A1 | 9/2009 | Shimogawa |
| 2010/0042988 | A1 | 2/2010 | Lundin |
| 2011/0004935 | A1 | 1/2011 | Moffie |
| 2011/0145659 | A1 | 6/2011 | Ikeyama |
| 2011/0161649 | A1 | 6/2011 | Bert |
| 2013/0152081 | A1 | 6/2013 | Ahrens et al. |

OTHER PUBLICATIONS

"U.S. Appl. No. 13/324,654 Office Action", Aug. 1, 2013, 27 Pages.

(Continued)

Primary Examiner — Kenneth Tang
(74) Attorney, Agent, or Firm — DeLizio Gilliam, PLLC

(57) ABSTRACT

A hypervisor includes methods to receive an event log from an event source. The event log includes a notify of every partition (NEP) flag. The status of the NEP flag indicates whether the event log is to be sent to all partitions. If the NEP flag is set to a value indicating that the event log is not to be sent to all partitions, then for each partition in a set of active partitions, the hypervisor reads a platform event monitor (PEM) flag for the partition. If the platform event monitor flag is set to a value indicating the partition is to receive the event, the hypervisor passes the event log to an event service for the partition.

17 Claims, 4 Drawing Sheets

(56) References Cited

OTHER PUBLICATIONS

Barker, Ron et al., "IBM Hardware Management Console Best Practices", Jan. 2007, 57 pages.

IBM, , "A method to Provide Adapter Events Notification to the OS in a Logical Partitioning Environment", Feb. 28, 2007, 4 pages.

Quintero, Dino et al., "Hardware Management Console (HMC) Case Configuration Study for LPAR Management", Redbooks Paper 2005, 58 pages.

U.S. Appl. No. 13/324,654, filed Dec. 13, 2011, Ahrens, George H., et al.

SELECTABLE EVENT REPORTING FOR HIGHLY VIRTUALIZED PARTITIONED SYSTEMS

RELATED APPLICATIONS

This application claims the priority benefit of U.S. application Ser. No. 13/324,654 filed Dec. 13, 2011.

BACKGROUND

Embodiments of the inventive subject matter generally relate to the field of computer systems, and, more particularly, to selectable event reporting for virtualized partitioned systems.

As the number of partitions on highly virtualized large computing systems rises to the thousands, the task of notifying operating systems running on those partitions of errors that occur on the underlying platform hardware becomes more time and resource consuming. The number of events that may occur combined with the number of partitions that may be running in a highly virtualized system presents challenges on the service infrastructure for passing service events to each of the active partitions and in process partitions that will be activated within a given time window of the error occurrence. The hypervisor typically must save the error log and distribute it to any partition that is activated within a specified time window of the occurrence of the event. Further, most of the underlying hardware is virtualized to the partitions, so reporting underlying platform events to only affected partitions is generally not possible because the hardware resources are not owned by any specific partition, but are virtualized to all partitions. As a result, hardware events are typically reported to all active partitions.

The stress on system resources caused by having to report events to many partitions can be exacerbated when the partitions are configured to report the events to a management console. In such cases, each of the partitions receiving the event also reports the event to a management console. Thus there can be thousands of partitions all reporting the same event to a management console, resulting in greatly increased overhead in processing the event. This is important because if the service infrastructure is busy performing event notification, then there can be delays processing other tasks normally performed by the partition or delays in processing exception system operation hypervisor requests.

SUMMARY

A hypervisor includes methods to receive an event log from an event source. The event log includes a notify every partition (NEP) flag. The status of the NEP flag indicates whether the event log is to be sent to all partitions. If the NEP flag is set to a value indicating that the event log is not to be sent to all partitions, then for each partition in a set of active partitions, the hypervisor reads a platform event monitor (PEM) flag for the partition. If the platform event monitor flag indicates the partition is to receive the event, the hypervisor passes the event log to an event service for the partition.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

Figure 1:
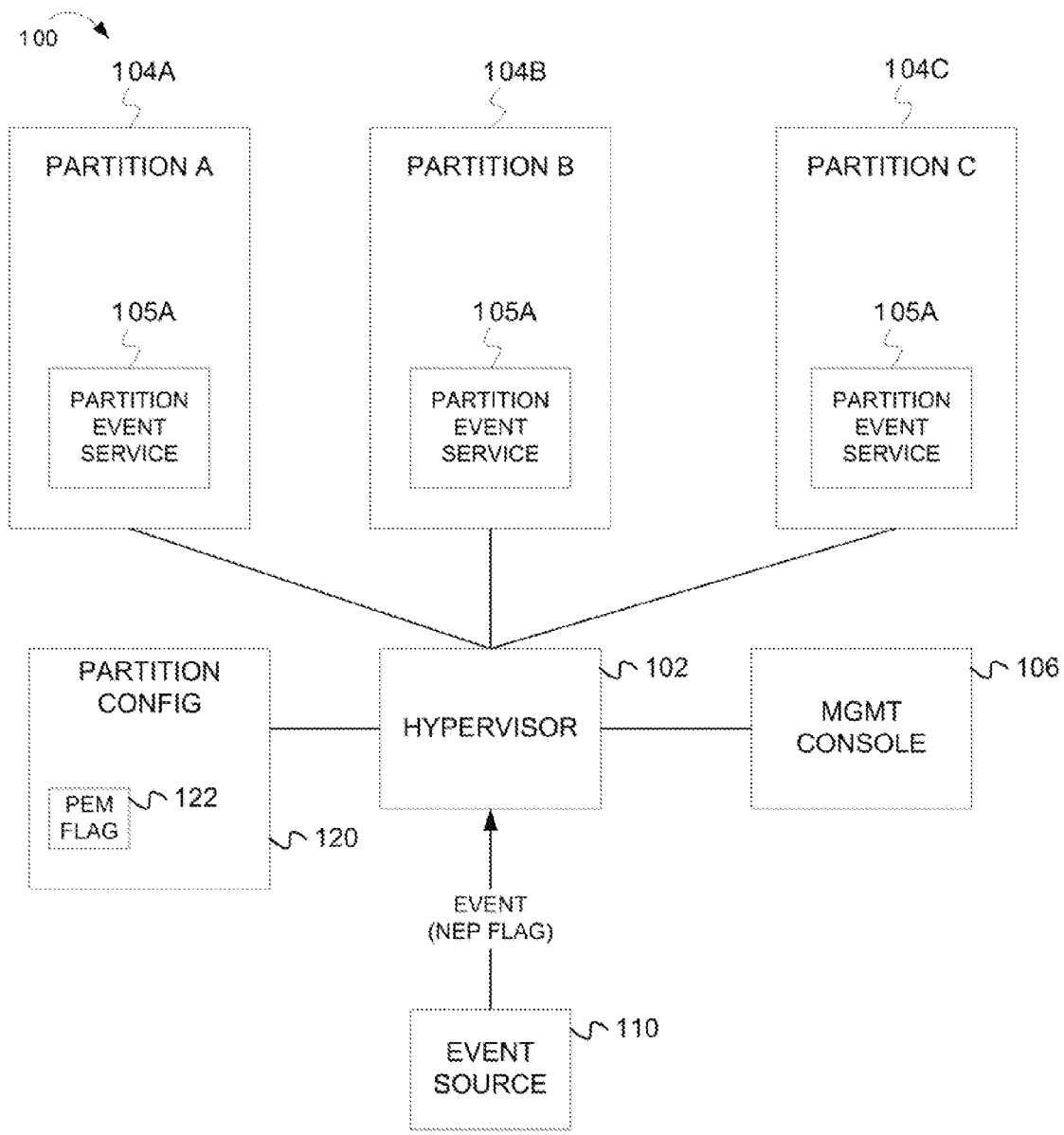
FIG. 1 is a block diagram depicting logical elements of a server system in which embodiments of the invention may be implemented.

FIG. 1 is a block diagram depicting logical elements of a server system 100 according to embodiments of the inventive subject matter. In some embodiments, system 100 includes a hypervisor 102, partitions 104, management console 106 and event sources 110. Hypervisor 102 manages a virtualized operating environment and provides virtualized resources (e.g., virtualized hardware resources) for partitions 104 configured for a server 100. Each of partitions 104 runs an operating system and applications within the partition. The operating system and applications running on one partition may be completely different from the operating system and applications running on other partitions. For example, one partition may be running an accounting system on the AIX operating system while another partition may run file server applications on a Linux operating system. Alternatively, a partition may run the same operating system and applications as another partition and serve as a backup in case of a failure or overload in the other partition. From the point of view of a partition, the partition appears to be an independent computer that controls the underlying hardware when in reality, each partition is sharing hardware resource with other partitions. A partition may also be referred to as a virtual machine, with the hypervisor also being referred to as a virtual machine manager.

A partition may have an event service 105 running within the partition. Event service 105 serves as a receiving point for receiving event logs that are reported to the partition, and for distributing the event logs to appropriate programs or threads running within the partition. A partition may have more than one event service 105 running within the partition, for example, to handle different types of events. The event service may be part of the operating system running on a partition or it may be a separate program.

Although three partitions are illustrated in FIG. 1, those of skill in the art will appreciate that a server system 100 may have tens, hundreds, or even thousands of partitions running on server system 100.

Management console 106 may optionally be present on server system 100, and provides administration, operation and maintenance functions for server system 100. Management console 106 may be used to configure partitions 104 and to receive reports of software and hardware events occurring on server system 100. Examples of management consoles include the HMC (Hardware Management Console), SDMC (System Director Management Console) and IVM (Integrated Virtualization Manager) management consoles.

Event source 110 is any hardware or software component running on system 100 that can generate an event. Various hardware components such as I/O systems, storage systems, memory systems, processors, power supply systems etc. can be an event source. The events generated by these components can have varying degrees of criticality. For instance, it is desirable that certain types of critical events be communicated to all partitions 104 so that appropriate actions can be taken by the operating system running in the partition 104 to maintain data integrity. Examples of such events include critical power/thermal (e.g., EPOW—Emergency Power Off Warning) or data integrity (e.g., SUE—System Uncorrectable Error) events. Other types of events that are less critical in nature might not need to be reported to every partition. For example, failure of a redundant power supply may not need to be reported to each partition if the main power supply is still operational. In addition, certain types of partitions (e.g. redundant routing partitions) are generally required to be notified of all serviceable events so that they can pass that service event on to a service consolidation point such as a management console 106.

In operation, upon the occurrence of an event, event source 110 sends data regarding the event to hypervisor 102. The event data may include an NEP (Notify Every Partition) flag that is set based on the criticality of the event. Hypervisor 102 receives the event data and determines which partitions are to receive the event data. The determination may be made by using the NEP flag, and a PEM (Platform Event Monitoring) flag 122 that is part of the configuration data 120 for a partition. If either the PEM flag 122 for the partition or NEP flag are true, then hypervisor 102 sends the event data to the partition. If both the PEM flag 122 for the partition and the NEP flag are false, then hypervisor 102 does not send the event data to the partition. The operation of system 100 as thus allows reporting of critical events to all partitions and reporting of less critical events to only those partitions so chosen by the system administrator as having a need to receive such event reports. This can ease the burden on the event reporting infrastructure within system 100. Further details on the operation of system 100 are provided below with reference to FIGS. 2 and 3.

Figure 2:
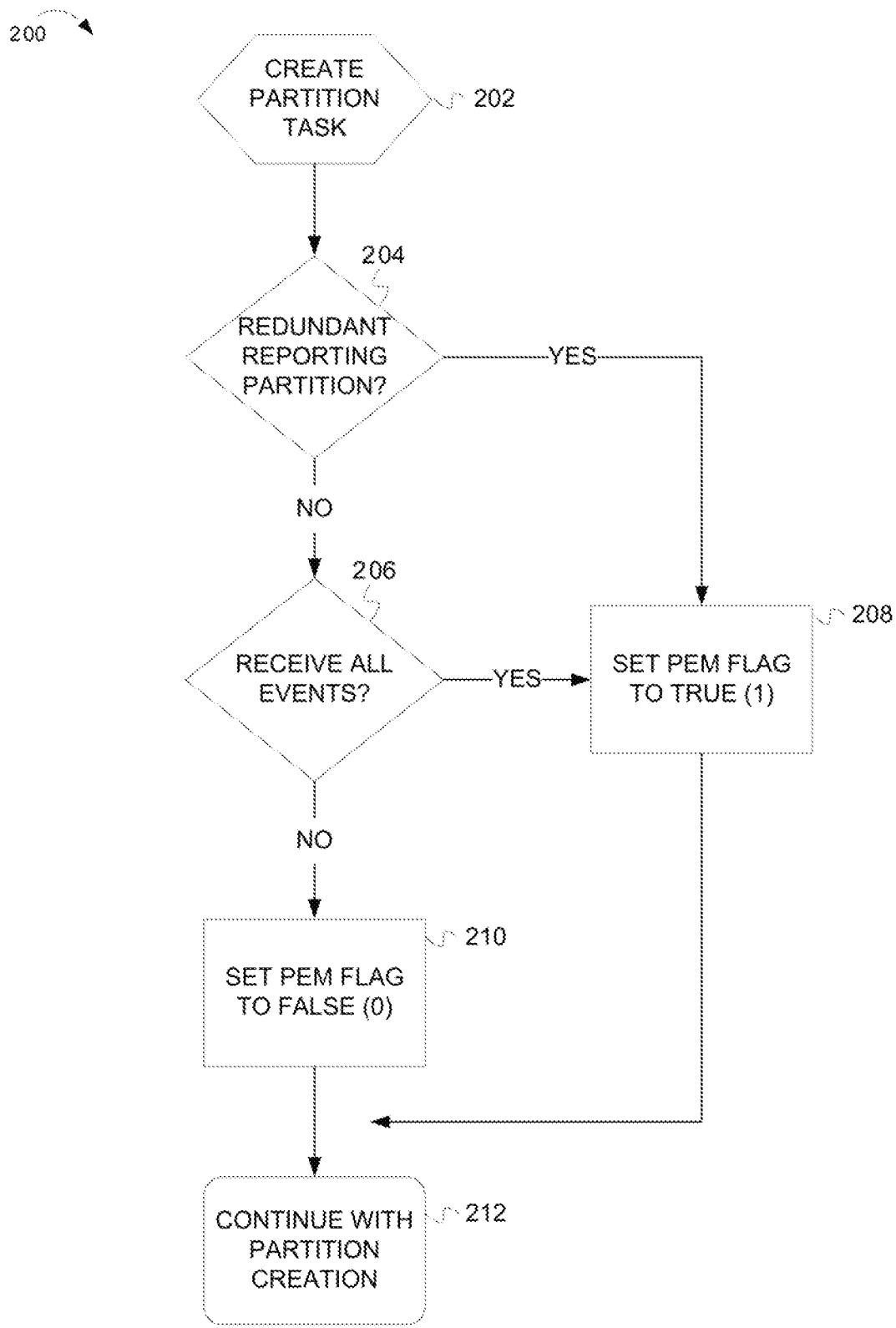
FIG. 2 is a flowchart illustrating a method for creating a partition.

FIG. 2 is a flowchart illustrating a method for creating a partition according to embodiments of the inventive subject matter. In the description below, reference will be made to setting values to "true" or "false." In some embodiments, the value "1" represents true and the value "0" represents false. However, those of skill in the art will appreciate that other values, including bit values, could be used to represent true and false. The method begins at block 202, where a create partition task is initialized. For example, a system administrator may initiate a create partition task on management console 106 in order to configure a new partition (or reconfigure an existing partition) for a server 100. The system administrator may use the create partition task to configure various parameters regarding the partition such as a partition identifier and the resources available to the partition. In some embodiments, the default value for the PEM flag associated with a partition is set to false (e.g., the partition will not receive all events, just critical events).

At block 204, the create partition task determines if the configuration parameters entered for the partition indicate that the partition is a redundant reporting partition. A redundant reporting partition is a partition that is designated to receive all events occurring on system 100 and to forward event data to a management console or other event data handler. A redundant reporting partition is useful in making sure that events flow to a desired point in the case that the primary event reporting mechanism fails. If the partition is designated as a redundant reporting partition, then the method proceeds to block 208 where the PEM flag is set to true (i.e., the partition is configured to receive all events). Designating a partition as a redundant reporting partition thus overrides any previous setting of the PEM flag. Generally, it is desirable to designate one or two partitions in a system as redundant reporting partitions in order to provide assurance that an event such as an error event is properly reported even in the case of a failure of a primary error reporting component. Further, it is desirable to limit the number of partitions that are designated as redundant reporting partitions in order to avoid overusing resources involved in reporting errors.

Alternatively, if the partition is not configured as a redundant reporting partition, then at block 206, the create partition task determines if the partition is to receive all events. For example, the create partition task may provide a user interface (and perhaps a prompt) to allow a system administrator to designate that the partition is to receive all events. As an example, a system administrator may designate that a partition that runs a mission critical application such as an ATM or payroll application is to receive all events, while a partition that runs a non-critical application (e.g., a blog server) need not receive all events. If the partition is to receive all events, then at block 208, the system sets the PEM flag to true.

If the partition is not a redundant reporting partition and is not configured to receive all events, then at block 210, the system sets the PEM flag to false. In some embodiments, the value of the PEM flag defaults to false and need not be explicitly set by a system administrator.

It should be noted that although the PEM flag has been described as having a true or false value, in some embodiments, the PEM flag can take on other values. For example, in some embodiments, the PEM flag may be a severity level value that indicates a threshold severity level that the partition is configured to receive. The system may provide a default value for the severity level value. A system administrator can accept the default value or choose to override the default value based on the system's anticipated usage. In alternative embodiments, the PEM flag may be a bitmask, where each bit represents an error, type of error, or severity level. A default set of bits may be provided as an initial value for the PEM flag, and a system administrator can override the default. In any case, the value for the PEM flag may be set as a default value, provided by a system administrator through a user interface, or read in programmatically.

At block 212, the method continues with creating the partition. For example, further partition parameters may be determined and the partition configuration may be saved to persistent storage.

Figure 3:
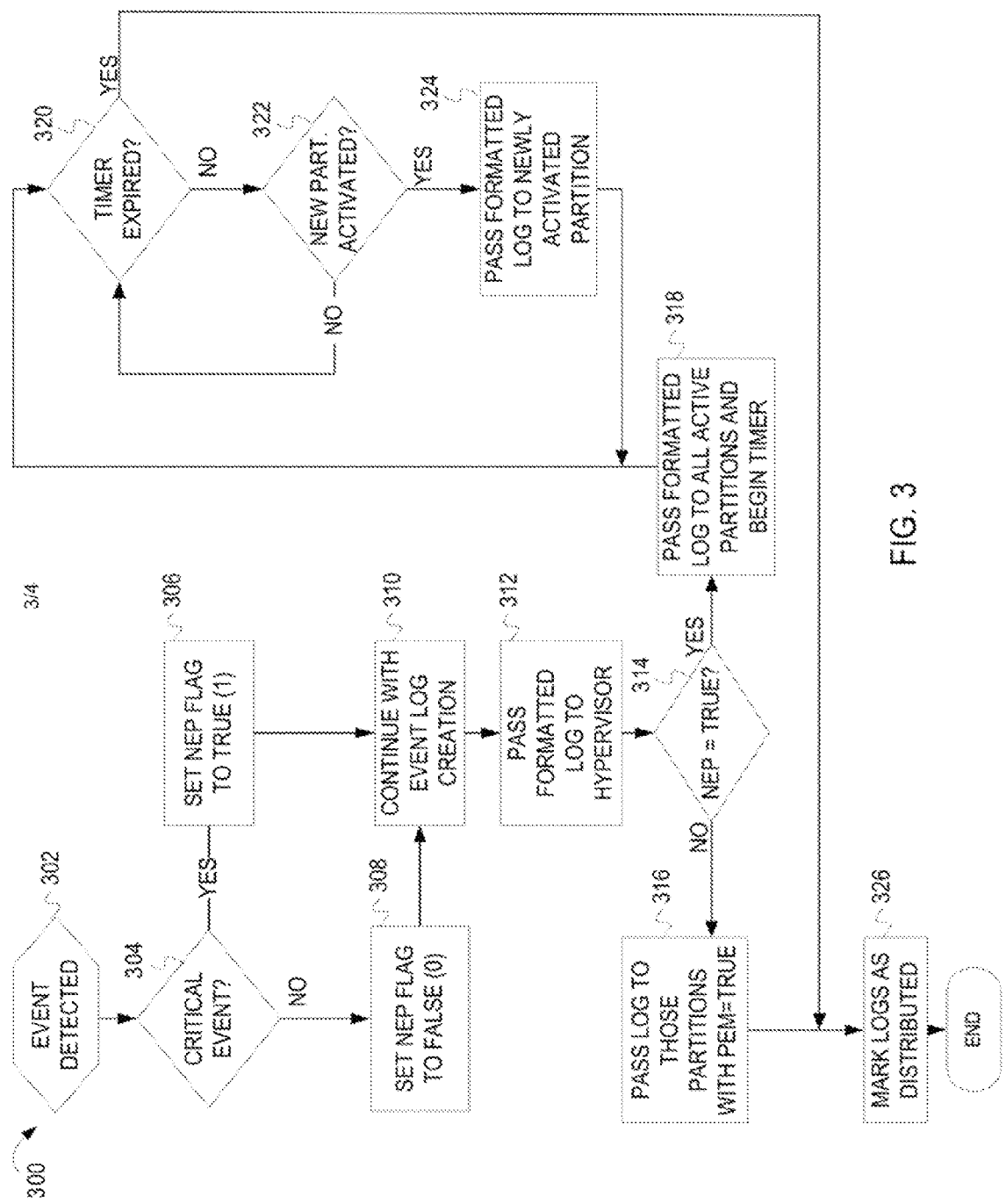
FIG. 3 is a flowchart illustrating a method for selectably reporting events.

FIG. 3 is a flowchart illustrating a method 300 for selectively reporting events generated on a system having virtualized partitions. In some embodiments, the method is triggered at block 302 by detecting an event in the system. Various components of the system may detect or generate the event. For example, the event may be an error event. In some embodiments, a system processor may detect errors in a processor, memory or power supply unit in the system, a hypervisor may detect errors in an I/O (input/output) subsystem, and an operating system component may detect errors in devices connected through the I/O subsystem. Upon the detection of such errors, an event may be generated.

At block 304, the firmware or software component detecting the event determines if the event is critical enough to warrant notification of all partitions. For example, an event may be a critical error. In general, a critical error is one that in which the severity of the error is such that it is desirable to notify every virtualized partition in the system. A developer of the error detection logic may encode rules and heuristics in the logic to determine if an error is a critical error. If the error is a critical error, then at block 306, a "Notify Every Partition" (NEP) flag in the data associated with the error is set to true. In general, the NEP flag may be set for critical errors which could impact the entire system or compromise data integrity if action is not taken. As an example, failure of a memory component can have an impact on the entire system and is thus typically considered a critical error. Conversely, failure of a redundant power supply while a primary power supply is operating correctly does not have an impact on the entire system and would not typically be considered a critical error that needs to be reported to every partition. If the event is not critical enough to warrant notifying all partitions (e.g., an error that is not a critical error), then at block 308 the NEP flag is set to false.

At block 310, the component detecting or generating the event continues to create an event log having data associated with the event. The event log may include, in addition to the NEP flag, data identifying the event, data indicating values of registers and status of the component causing or experiencing the event, time stamps etc. The event log may be formatted to conform to a standard event reporting log for the system.

At block 312, the event log is sent to a hypervisor for further processing of the event.

At block 314, the hypervisor receives the event log from the reporting component, and examines the NEP flag in the event log. If the NEP flag is set to false, then the event is one that need not be reported to every partition. In this case, at block 316, the hypervisor passes the event log to those partitions where the PEM flag in the partition configuration data indicates that the partition is to receive the event. In embodiments where the PEM flag is a Boolean flag, the hypervisor sends the event log to those partitions where the PEM flag has been set to true indicating that the partition is configured to receive all events. Alternatively, in embodiments where the PEM flag indicates a threshold severity level for a partition, the hypervisor determines if the event log has a severity level that exceeds the threshold severity level set for the partition. If so, then at block 316 the hypervisor passes the event log to those partitions where the event log severity level exceeds the partition's threshold event severity level as set in the PEM flag. Similarly, in embodiments where the PEM flag is a bit flag, the hypervisor determines if the PEM flag has a bit set corresponding to the event reported in the event log. If so, then at block 316 the hypervisor passes the event log to those partitions having the appropriate bit or bits set in the partition's PEM flag.

Alternatively, if the check at block 314 determines that the NEP flag is set to true, then control passes to block 318, where the hypervisor passes the event log to all active partitions, regardless of the state of the PEM flag.

In some embodiments, blocks 320-324 are optionally executed in environments where it is desirable to pass event log information to partitions that are not active at the time of the event, but become active within a predetermined or configurable time period following the occurrence of the event. At block 320, the hypervisor checks to determine if a timer associated with the predetermined or configurable time period has expired. If the timer has not expired, then at block 322, the hypervisor checks to determine if any new partitions have been created or activated after the event was initially detected. If a partition is created, or a previously created partition is activated, then at block 324, the hypervisor passes the event log to the newly created or activated partition.

If the timer has expired, then control passes to block 326, where the hypervisor marks the event log as having been distributed to all partitions that desire notification of the event.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
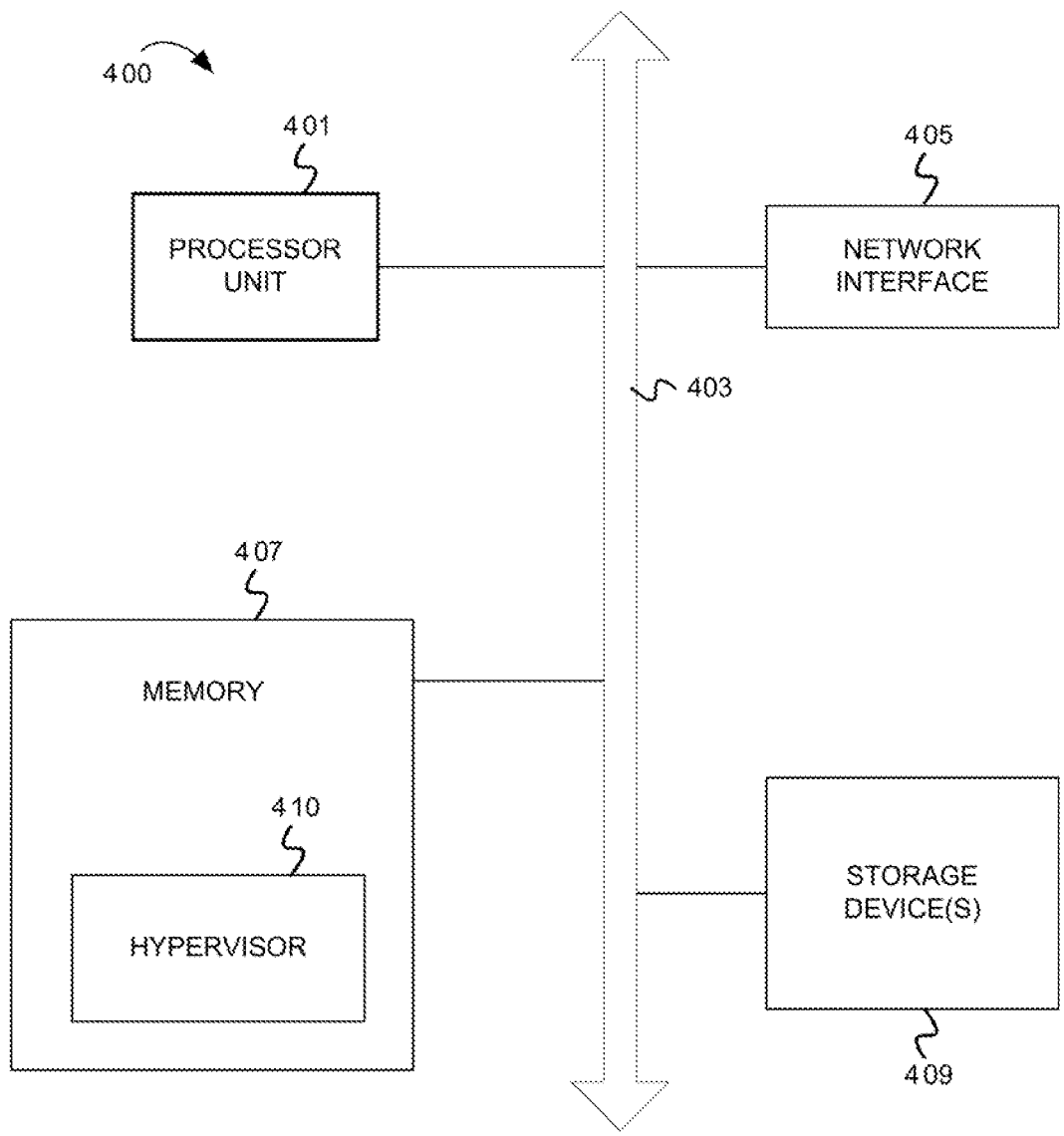
FIG. 4 is a block diagram depicting elements of a computer system.

FIG. 4 depicts an example computer system. A computer system includes a processor unit 401 (possibly including multiple processors, multiple cores, multiple nodes, and/or implementing multi-threading, etc.). The computer system includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 403 (e.g., PCI, ISA, PCI-Express, HyperTransport®, InfiniBand®, NuBus, etc.), a network interface 405 (e.g., an ATM interface, an Ethernet interface, a Frame Relay interface, SONET interface, wireless interface, etc.), and a storage device(s) 409 (e.g., optical storage, magnetic storage, etc.). The system memory 407 embodies functionality to implement embodiments described above. The system memory 407 may include one or more functionalities that facilitate selectable event reporting in systems with highly virtualized partitions Any one of these functionalities may be partially (or entirely) implemented in hardware and/or on the processing unit 401. For example, the functionality may be implemented with an application specific integrated circuit, in logic implemented in the processing unit 401, in a co-processor on a peripheral device or card, etc. Further, realizations may include fewer or additional components not illustrated in FIG. 4 (e.g., video cards, audio cards, additional network interfaces, peripheral devices, etc.). The processor unit 401, the storage device(s) 409, and the network interface 405 are coupled to the bus 403. Although illustrated as being coupled to the bus 403, the memory 407 may be coupled to the processor unit 401.

While the embodiments are described with reference to various implementations and exploitations, it will be understood that these embodiments are illustrative and that the scope of the inventive subject matter is not limited to them. In general, techniques for selectively reporting events to virtualized partitions as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   receiving an event log, the event log including a notify every partition (NEP) flag; and
   upon determining that the NEP flag is set to false, then for each partition in a set of active partitions, performing operations comprising:
     reading a platform event monitor (PEM) flag for the partition,
       upon determining that the PEM flag indicates the partition is to receive the event log, then passing the event log to an event service for the partition;
     setting a tinier upon receiving the event log;
     determining that a new partition has been activated after the event log is received but prior to expiration of the timer; and
     upon determining that the new partition has been activated after the event log is received but prior to expiration of the timer, forwarding the event log to the new partition.

2. The method of claim 1, wherein the PEM flag comprises a boolean value and wherein determining that the platform event monitor flag indicates the partition is to receive the event log includes determining whether the PEM flag is set to a value indicating that the partition is to receive all event logs.

3. The method of claim 1, wherein the PEM flag indicates a threshold event severity and wherein determining that the platform event monitor flag indicates the partition is to receive the event log includes determining whether an event severity associated with the event log exceeds the threshold event severity.

4. The method of claim 1, wherein the PEM flag comprises a bit mask and wherein determining that the platform event monitor flag indicates the partition is to receive the event log includes determining whether a hit corresponding to an event associated with the event log is set in the bit mask.

5. The method of claim 1, and further comprising:
   determining if the partition is a redundant reporting partition; and
   upon determining that the partition is a redundant reporting partition, setting the PEM flag to a value indicating the partition is to receive all events.

6. The method of claim 1, and further comprising marking the event log complete upon expiration of the timer.

7. A computer program product for passing event logs to partitions, the computer program product comprising:
  a computer readable storage medium having computer usable program code embodied therewith, the computer usable program code comprising a computer usable program code configured to:
    receive an event log, the event log including a notify every partition (NEP) flag;
    upon determining that the NEP flag is set to false, then for each partition in a set of active partitions, perform operations comprising:
      read a platform event monitor (PEM) flag for the partition, and
      upon determining that the platform event monitor flag indicates the partition is to receive the event log, then pass the event log to an event service for the partition;
    set a timer upon receiving the event log;
    determine that a new partition has been activated after the event log is received but prior to expiration of the timer; and
    upon determining that the new partition has been activated after the event log is received but prior to expiration of the timer, forward the event log to the new partition.

8. The computer program product of claim 7, wherein the PEM flag comprises a boolean value and wherein the operations comprising determining that the platform event monitor flag indicates the partition is to receive the event log includes operations for determining whether the PEM flag is set to a value indicating that the partition is to receive all event logs.

9. The computer program product of claim 7, wherein the PEM flag indicates a threshold event severity and wherein the operations comprising determining that the platform event monitor flag indicates the partition is to receive the event log include operations for determining whether an event severity associated with the event log exceeds the threshold event severity.

10. The computer program product of claim 7, wherein the PEM flag comprises a bit mask and wherein the operations comprising determining that the platform event monitor flag indicates the partition is to receive the event log includes operations for determining whether a bit corresponding to an event associated with the event log is set in the hit mask.

11. The computer program product of claim 7, wherein the computer usable code further includes computer usable code configured to:
  determine if the partition is a redundant reporting partition; and
  upon determining that the partition is a redundant reporting partition, set the PEM flag to a value indicating the partition is to receive all events.

12. The computer program product of claim 7, wherein the computer usable code further includes computer usable code configured to mark the event log complete upon expiration of the timer.

13. An apparatus comprising:
  one or more processors; and
  a hypervisor executable by the one or more processors, and configured to:
    receive an event log, the event log including a notify every partition (NEP) flag,
    upon determining that the NEP flag is set to false, then for each partition in a set of active partitions, perform operations comprising:
      read a platform event monitor (PEM) flag for the partition, and
      upon determining that the platform event monitor flag indicates the partition is to receive the event log, then pass the event log to an event service for the partition;
    set a timer upon receiving the event log;
    determine that a new partition has been activated after the event log is received but prior to expiration of the timer; and
    upon determining that the new partition has been activated after the event log is received but prior to expiration of the timer, forward the event log to the new partition.

14. The apparatus of claim 13, wherein the PEM flag comprises a Boolean value and wherein the operations comprising determining that the platform event monitor flag indicates the partition is to receive the event log includes operations for determining whether the PEM flag is set to a value indicating that the partition is to receive all event logs.

15. The apparatus of claim 13, wherein the PEM flag indicates a threshold event severity and wherein the hypervisor is further configured to determine whether an event seven associated with the event log exceeds the threshold event severity.

16. The apparatus of claim 13, wherein the hypervisor is further configured to:
  determine if the partition is a redundant reporting partition; and
  upon determining that the partition is a redundant reporting partition, set the PEM flag to a value indicating the partition is to receive all events.

17. The apparatus of claim 13, wherein the hypervisor is further configured to mark the event log complete upon expiration of the timer.

* * * * *